Oct. 8, 1935.  L. L. DOLLINGER  2,016,993
AIR FILTER
Filed Oct. 8, 1934
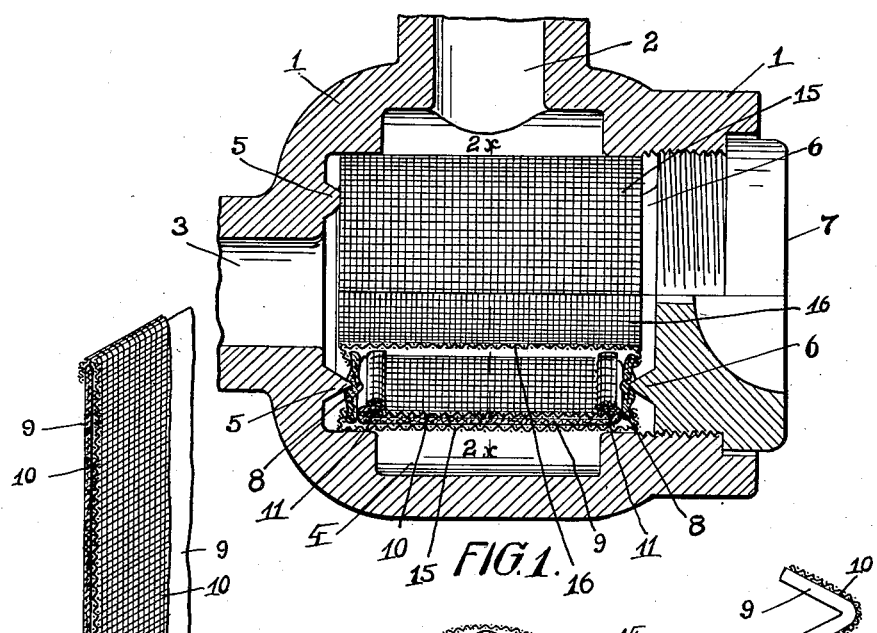
FIG.1.
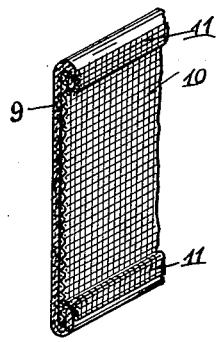
FIG.5.  FIG.2.  FIG.4.
FIG.6.
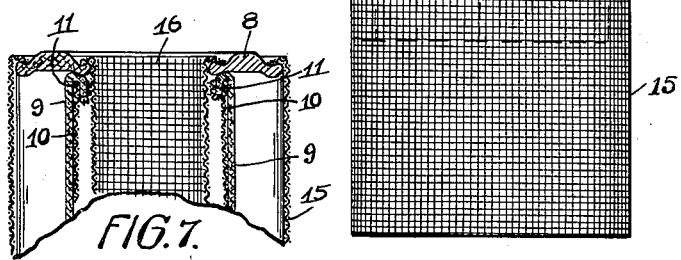
FIG.7.  FIG.3.
INVENTOR
LEWIS L. DOLLINGER
BY
ATTORNEY Patented Oct. 8, 1935

2,016,993

UNITED STATES PATENT OFFICE 2,016,993

AIR FILTER

Lewis L. Dollinger, Rochester, N. Y., assignor to Staynew Filter Corporation, Rochester, N. Y.

Application October 8, 1934, Serial No. 747,299

8 Claims. (Cl. 183—71)

This invention relates to air filters and has for one of its objects to provide an air filter unit which can be removably mounted in an air line at a suitable point in the line so as to efficiently filter the air forced therethru under pressure.

Another object of this invention is to so construct the filtering unit that its filtering medium will have a maximum filtering surface.

A further object of this invention is to provide the filtering unit with sealing means which form part of the unit.

Another object of this invention is to make the construction of the unit extremely simple and inexpensive to manufacture.

A further object of this invention is to provide a novel method of supporting the filtering medium of the unit.

All these and other objects of this invention will become more readily apparent from the detailed description thereof which follows, reference being had to the accompanying drawing in which Figure 1 is a sectional view of a pipe line connecting member with the air filter unit mounted therein partially in section.

Figure 2 is a cross section of the filtering unit, the section being taken on the line 2x—2x of Figure 1.

Figure 3 is a side elevation of the component parts of the filtering unit in process of assembly.

Figure 4 is a top plan view of a strip of the filtering medium and its support ready for assembly into a unit.

Figure 5 is a perspective view of the end of the filtering medium and its support illustrating the first step in the manufacture of the unit.

Figure 6 is a perspective view of the filtering medium and its support illustrating the second step in the manufacture of the unit.

Figure 7 is a sectional view of the end portion of one of the filtering units.

In the several figures of the drawing like reference numerals indicate like parts.

The filtering unit forming the subject matter of my present invention is especially adapted for use in air brake systems although it may be used in any other installations where it is necessary or desirable to efficiently filter air under pressure.

As illustrated in Figure 1 of the drawing, the filtering unit is shown mounted in a suitable housing 1 having one or more inlets 2 in the wall of the housing and an outlet 3 in one end thereof. Each end of the cylindrical interior of the housing is reduced in diameter so as to engage the ends of the cylindrically shaped filtering unit and hold it concentrically within the housing and provide an annular chamber 4 around the outside of the unit intermediate the ends thereof. The inlet or inlets 2 lead into this space so that the air entering the housing can enter the filtering unit over the entire outer surface thereof which is exposed within the annular chamber 4.

One end of the filtering unit is held sealed in the reduced end of the inside of the housing by means of the concentrically arranged annular sealing ridge 5 which surrounds the outlet 3 of the housing on the inside thereof and the other end of the filtering unit is held sealed in the reduced end of the inside of the housing by means of a similar sealing ridge 6 provided on the inside of the plug 7 which closes the opening in the end of the housing thru which the filtering unit is inserted or removed. As will hereinafter be described, each end of the filtering unit is provided with a felt washer 8 and the annular sealing ridges 5 and 6 engage into these washers to provide seals around the ends of the filtering unit which keep the compressed air from leaving the housing thru the outlet 3 unless it passes first thru the filtering medium of the filtering unit.

The filtering unit is made up of a filtering medium 9 such as felt or other similar fabric material. This filtering medium is supported by a screen 10. The filtering medium and screen are combined and formed into a strip by bringing them together and bending the overhanging edges of the screen over the edges of the filtering medium and thus locking the filtering medium to the screen along their edges the full length thereof. This first step in the manufacture of the filtering unit is illustrated in Figure 5.

In the second step of the method of making the filtering unit which is illustrated in Figure 6, the combined filtering medium and supporting screen has its locked edges folded back on itself so as to have the filtering medium extend over the edge of the combined strip on the outside of the screen. The filtering medium is thus firmly stretched and held to cover one side and the longitudinal edges of the screen. The bent and thickened edges 11 of the combined screen and filtering medium thus formed then serve as spacing flanges in the formation of the filtering unit as will hereinafter appear.

The third step of the making of the filtering unit is illustrated in Figure 4 in which the combined screen and filtering medium is bent into a continuous series of V shaped folds 12, 12. After this is done a folded strip comprising a predetermined number of the V shaped folds is formed into a cylindrical shape with the screen on the inside and the filtering medium on the outside thereof. To keep the combined screen and filtering medium permanently in this form the free ends of the strip are brought together and clamped together by means of the clamping strap 13 or any other suitable fastening means. When the combined filtering medium and screen is formed into a cylindrical shape as above described, it will appear as illustrated in Figure 2 and an inspection of this figure shows how the thickened edges of the filtering medium and screen space the walls of the filtering unit at the ends so as to provide radial pockets 14 which lead radially into the open center of the unit and provide for unobstructed passage of the air into the open center after it has passed thru the filter medium and been filtered thereby.

To complete the filtering unit, the outside thereof is surrounded by a cylindrical screen 15 and the open center has the cylindrical screen 16 telescoped thereinto. The felt washers 8, 8 are then placed at each end of the unit and the edges of the cylindrical screens 15 and 16 are folded over these washers (as shown in Fig. 1) to hold them in place against the edges of the filtering medium at the end of the unit so as to seal the ends of the radial pockets 14 as well as provide the circular sealing member for the ends of the unit with which the filtering unit is sealed into the housing 1 as above described.

I claim:

1. The method of preparing the filtering medium of a filtering unit which consists in placing the filtering medium against a reinforcing screen, folding the longitudinal edges of the screen in one direction over the longitudinal edges of the filtering medium to lock the filtering medium to the screen, then folding the combined edges of the filtering medium and screen in the opposite direction so as to hold the filtering medium exposed on one side and on the longitudinal edges of the screen.

2. The method of reinforcing the filtering medium of a filtering unit which consists in placing the filtering medium against a reinforcing screen, folding the longitudinal edges of the screen in one direction over the longitudinal edges of the filtering medium, then folding the combined edges of the filtering medium and screen in the opposite direction so as to provide a reinforcing flange along the longitudinal edges with the filtering medium exposed and overhanging the longitudinal edges.

3. The method of making a filtering unit which consists in placing the filtering medium against a reinforcing screen, bending the longitudinal edges of the screen over the longitudinal edges of the filtering medium to lock the filtering medium to the screen, folding a predetermined width of the edges of the combined filtering medium and screen back over the screen to expose the filtering medium along the longitudinal edges of the combined screen and filtering medium and form a pair of thickened flanges on the screen reinforced side of the filtering medium, bending V shaped transverse channels into the screen reinforced filtering medium and arranging a series of the V shaped channels into cylindrical form with the screen side of the filtering medium on the inside so as to have the thickened flanges thereof space the V shaped channels into radial pockets leading from the open center of the filtering unit with the filtering medium located on the outside and end of the radial pockets.

4. A tubular filtering unit made up of a filtering medium having a reinforcing screen on one side thereof, a pair of parallel flanges formed along the edges of the reinforcing screen with a connection at their inner edges so as to form an outwardly opening channel between these flanges along the edges of the screen for holding the filtering medium over the longitudinal edges of said screen and providing sealing means at each end of the filtering unit.

5. A tubular filtering unit comprising a filtering medium supported on the outside of a reinforcing screen, a locking channel formed parallel to the edges of said reinforcing screen so as to open outwardly thereof to receive the edges of said filtering medium and reinforce each side thereof and hold said filtering medium stretched over the outside and the edges of said reinforcing screen.

6. A tubular filtering unit as set forth in claim 5 in which longitudinal folds are formed in the combined filtering medium and reinforcing screen and arranged radially around an open center to provide radial pockets leading from the open center of the filtering unit with the locking channel in the edges of the reinforcing screen spacing the walls of the pockets at the top and bottom thereof.

7. A tubular filtering unit as set forth in claim 5 with a cylindrical screen surrounding the outside of said reinforcing filtering screen and filtering medium and a tubular screen surrounded by said filtering medium and reinforcing screen and a sealing washer at each end of said tubular screens with the ends of both of said tubular screens overlapping the sealing washers to hold said washers in place on the ends of said filtering unit with a circular strip exposed between the outer and inner reinforcing screen at the ends of the filtering unit.

8. A tubular filtering unit comprising a reinforcing screen and a filtering medium stretched over the outside thereof with the edges of said reinforcing screen and filtering medium being folded so as to provide a spacing flange along the longitudinal edges thereof with the filtering medium covering the outside of the longitudinal edges, folds formed in said combined filtering medium to provide radially arranged pockets around an open center of said filtering unit with the spacing flanges along the edges spacing the wall of said pockets, a sealing washer at the ends of said filtering unit to close the top and bottom of said pockets and provide means for sealing the ends of the filtering unit between opposing walls and fastening means extending from one end of said filtering unit to the other and engaging the edges of said sealing washers to hold said washers in place on the ends of the filtering unit with a portion of the washers exposed to provide combined sealing and supporting means for the filtering unit.

LEWIS L. DOLLINGER.